United States Patent
Todaka (10) Patent No.: US 8,233,198 B2
(45) Date of Patent: Jul. 31, 2012

(54) IMAGE PROCESSING APPARATUS, METHOD OF CONTROLLING IMAGE PROCESSING APPARATUS, AND COMPUTER PROGRAM

(75) Inventor: Shinji Todaka, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1037 days.

(21) Appl. No.: 12/181,218

(22) Filed: Jul. 28, 2008

(65) Prior Publication Data

US 2009/0051980 A1    Feb. 26, 2009

(30) Foreign Application Priority Data

Aug. 24, 2007    (JP) .................................. 2007-218934

(51) Int. Cl.
*H04N 1/04*    (2006.01)

(52) U.S. Cl. ....... 358/468; 358/1.14; 358/1.15; 358/402

(58) Field of Classification Search .................. 358/468, 358/1.14, 1.15, 402
See application file for complete search history.

(56) References Cited

U.S. PATENT DOCUMENTS

| | | | |
|---|---|---|---|
| 6,151,609 A * | 11/2000 | Truong | 715/205 |
| 7,027,171 B1 * | 4/2006 | Watanabe | 358/1.15 |
| 7,302,475 B2 * | 11/2007 | Gold et al. | 709/217 |
| 7,408,658 B2 | 8/2008 | Twede | |
| 7,434,161 B2 | 10/2008 | Todaka et al. | |
| 7,707,243 B2 * | 4/2010 | Kobayashi et al. | 709/203 |
| 2002/0067499 A1 * | 6/2002 | Sakamoto et al. | 358/1.14 |
| 2003/0069919 A1 * | 4/2003 | Takahashi et al. | 709/108 |
| 2005/0108353 A1 | 5/2005 | Yamamoto | 709/208 |
| 2005/0219607 A1 * | 10/2005 | Yamaguchi et al. | 358/1.15 |
| 2006/0136488 A1 | 6/2006 | Mifune et al. | |
| 2009/0122333 A1 | 5/2009 | Kato | |

FOREIGN PATENT DOCUMENTS

| | | |
|---|---|---|
| JP | 2001256155 A | 9/2001 |
| JP | 2003233473 A | 8/2003 |
| JP | 2005-149320 | 6/2005 |
| JP | 2005197949 A | 7/2005 |
| JP | 2006180289 A | 7/2006 |
| JP | 2007027861 A | 2/2007 |
| JP | 2007133853 A | 5/2007 |

OTHER PUBLICATIONS

Japanese Office Action dated Jan. 20, 2012 in corresponding Japanese Patent Application No. 2007-218934.

* cited by examiner

*Primary Examiner* — Houshang Safaipour
(74) *Attorney, Agent, or Firm* — Fitzpatrick, Cella, Harper & Scinto (57) ABSTRACT

An image processing apparatus, which can communicate with an external apparatus that provides WEB information, is provided. The apparatus comprises a storage unit configured to store a plurality of flow files that describe process contents of processes to be executed by the image processing apparatus, and an execution order; an acquisition unit configured to acquire WEB information from the external apparatus; a display unit configured to display a window based on the acquired WEB information; a selecting unit configured to select a flow file to be executed for the WEB information acquired by the acquisition unit; a processing unit configured to generate image data based on execution of the selected flow file; a storing unit configured to store the image generated data; and a transmission unit configured to transmit the image data stored in the storing unit to the external apparatus in accordance with a transmission instruction.

9 Claims, 12 Drawing Sheets

```
621  <?xml version="1.0" encoding="utf-8"?>
     <Export xmlns="http://www.ganon.com/ns/active/WorkflowComposer">
622  <Workflow id="3854" owner="aaa" Name="SCAN/PDF" Kind="Scan,Browser">
623  <Related url="http://www.ganon.com">
     <Function id="BoxScan" no="1">
624  <OpenScreenSetting>
     <Screen id="CIddScbBasic">false</Screen>
     </OpenScreenSetting>
     ...
```

FIG. 7A

```
<html>
<head><title>HOW TO ORDER</title></head>
<body>
<h1>HOW TO ORDER</h1>
<ol>
<li>SIGN YOUR NAME ON ORDER SHEET AND SEND IT VIA FAX</li>
<li>OR UPLOAD ORDER SHEET</li>
</ol>
<form enctype="multipart/form-data" action="get.cgi" method="post">
ESTIMATION SHEET:<input name=file1 type="file"><br>
ORDER SHEET:<input name=file2 type="file">
<input type="submit" value="TRANSMIT">
</form>
</body>
</html>
```

HOW TO ORDER

1. SIGN YOUR NAME ON ORDER SHEET AND SEND IT VIA FAX
2. OR UPLOAD ORDER SHEET

ESTIMATION SHEET : [____705____]  [ BROWSE... ] — 703

ORDER SHEET : [____________]  [ BROWSE... ] — 704
                      706

[ TRANSMIT ]
     707

```
<html>
<head><title>HOW TO ORDER</title></head>
<body>
<h1>HOW TO ORDER</h1>
<ol>
<li>SIGN YOUR NAME ON ORDER SHEET AND SEND IT VIA FAX</li>
<li>OR UPLOAD ORDER SHEET</li>
</ol>
<form enctype="multipart/form-data" action="get.cgi"
method="post">
<input name="userfile1" type="file">
<input type="submit" value="TRANSMIT">
</form>
</body>
</html>
```

HOW TO ORDER

1. SIGN YOUR NAME ON ORDER SHEET AND SEND IT VIA FAX
2. OR UPLOAD ORDER SHEET

SCAN AND SEND DOCUMENT

[SETTINGS] [TRANSMIT]

1103    1104

IMAGE PROCESSING APPARATUS, METHOD OF CONTROLLING IMAGE PROCESSING APPARATUS, AND COMPUTER PROGRAM

BACKGROUND OF THE INVENTION

1. Field of the Invention

The present invention relates to an image processing apparatus, a method of controlling an image processing apparatus, and a computer program.

2. Description of the Related Art

The effectiveness of WEB techniques in workflows of offices has gained more recognition due to the versatility and convenience of the techniques. As a result of progress in digitization of paper documents, situations of uploading digital documents to WEB sites are increasing. For example, in a workflow for billing a company for transportation expenses at a WEB site, a receipt may be updated to the site.

In general, in order to upload a paper document to a WEB site, at least the following two steps of operations are required, thus forcing the user to spend much time and effort. The user operates a personal computer (PC) to scan a paper document using an image reading apparatus connected to that PC so as to convert the document into digital data, thus retrieving the document into the PC as image data. The user then operates the PC to upload the retrieved image data via a WEB browser on the PC.

On the other hand, it is possible to provide a unique system for directly connecting the image reading apparatus and WEB site on both the sides of the apparatus and WEB site. However, for this purpose, the investments of vendors and manufacturers are required, and it is difficult to maintain compatibility between the apparatus and site to provide the unique system.

Hence, an image forming apparatus which can solve such a problem has been proposed (see Japanese Patent Laid-Open No. 2005-149320). This reference has proposed a mechanism in which a button for "transmitting an image to a site" is displayed on an operation unit based on an HTML document received from a WEB site, a scanner scans a document in response to the operation of that button, and generated image data is transmitted to the WEB site.

Figure 11A:
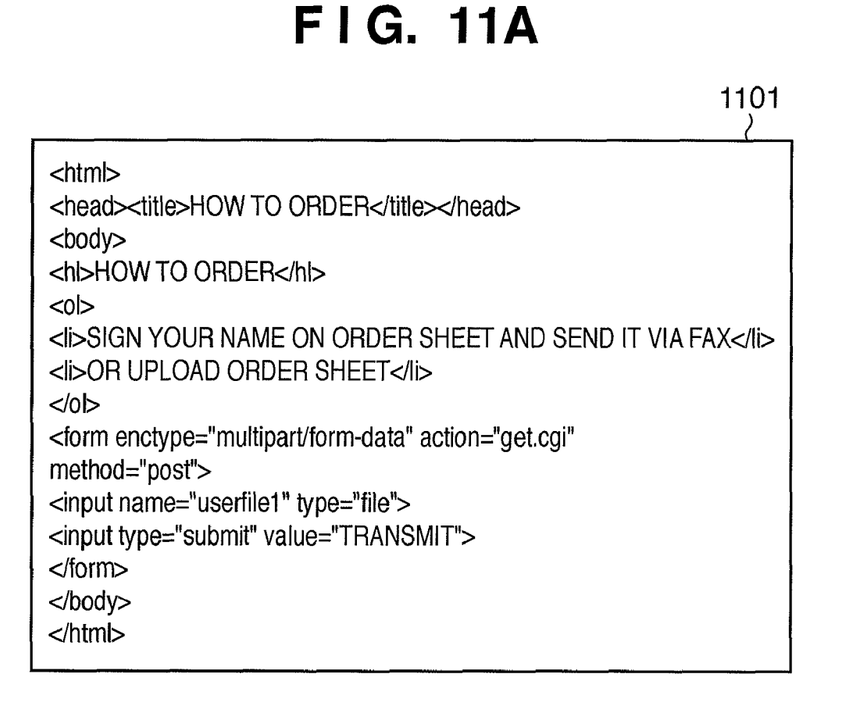
FIG. 11A is a view showing the configuration of a conventional HTML file.
Figure 11B:
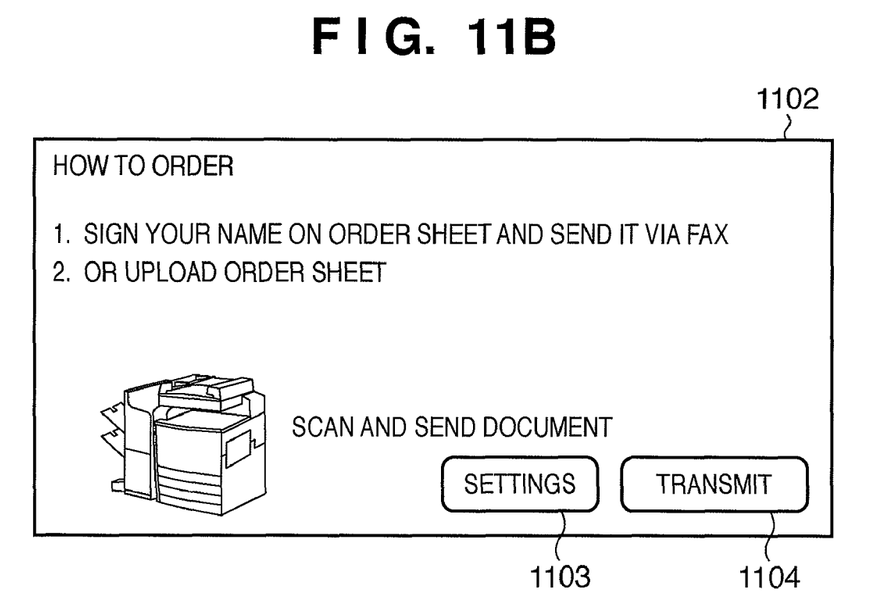
FIG. 11B is a view showing a browser display window corresponding to the HTML file in FIG. 11A.

An overview of the processing of the image forming apparatus according to this proposal will be described below with reference to FIGS. 11A and 11B. Upon reception of an HTML file 1101 shown in FIG. 11A from an external apparatus via a network, the image forming apparatus displays a display window 1102 shown in FIG. 11B on its screen. If the user operates a setting button 1103, the image forming apparatus can switch the content of the display window 1102 and can display a setting window associated with document scanning. If the user presses a transmission button 1104, the image forming apparatus generates image data of a document by scanning the document using its scanner, and transmits the image data to the WEB site.

SUMMARY OF THE INVENTION

However, the technique described in Japanese Patent Laid-Open No. 2005-149320 above cannot apply to a web site that requires registration of a plurality of images since the image forming apparatus transmits a scanned image to a predetermined WEB site immediately after scanning. For this reason, an apparatus is required to prepare a dedicated page used to register one image per page, thus limiting the use range of the apparatus.

Also, parameter settings such as the resolution, image format designation, and the like upon scanning are required as needed, thus forcing the user to spend time and effort.

Hence, the present invention provides a function of allowing the user to easily register image data in a WEB site using a flow file prepared on the apparatus.

According to an exemplary embodiment of the present invention, there is provided an image processing apparatus, which can communicate with an external apparatus that provides WEB information, comprising: a storage unit configured to store a plurality of flow files that describe process contents of processes to be executed by the image processing apparatus, and an execution order; an acquisition unit configured to acquire WEB information from the external apparatus; a display unit configured to display a window based on the acquired WEB information; a selecting unit configured to select a flow file to be executed for the WEB information acquired by the acquisition unit; a processing unit configured to generate image data based on execution of the selected flow file; a storing unit configured to store the image data generated by the processing unit; and a transmission unit configured to transmit the image data stored in the storing unit to the external apparatus in accordance with a transmission instruction input via the window displayed by the display unit.

Further features of the present invention will become apparent from the following description of exemplary embodiments with reference to the attached drawings.

DESCRIPTION OF THE EMBODIMENTS

An embodiment of the present invention will be described hereinafter with reference to the accompanying drawings.

Figure 1:
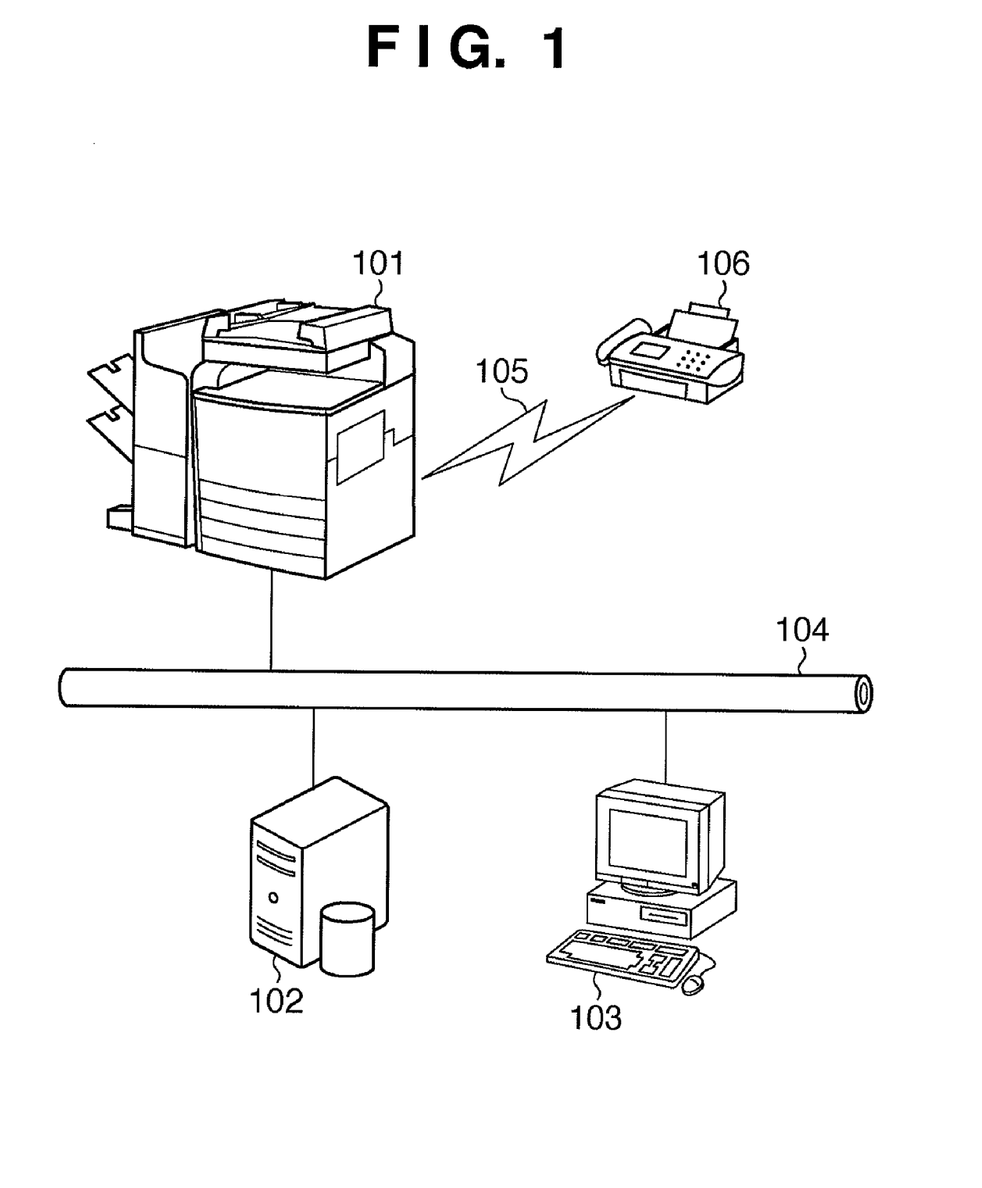
FIG. 1 is a view showing an example of the configuration of a network to which an image forming apparatus according to an embodiment of the invention is connected.

FIG. 1 is a view showing an example of the configuration of a network to which an image processing apparatus according to an embodiment of the invention is connected. Note that the embodiment to be described hereinafter will exemplify a multi-function peripheral (MFP) having a data transmission/reception function and an image storing function inside the MFP as the image processing apparatus.

As shown in FIG. 1, an MFP 101 as the image processing apparatus is connected to a LAN 104 such as Ethernet® or the like, and can communicate with a WEB server 102 and client computer 103 as external apparatuses. The MFP 101 is also connected to a PSTN 105 together with a facsimile apparatus 106.

The MFP 101 has a copy function and facsimile function, and also a data transmission function of scanning a document, and transmitting scanned image data to respective apparatuses on the LAN 104. Since the MFP 101 has a PDL (Page Description Language) function, it can receive and print a PDL image transmitted from a computer connected on the LAN 104.

Furthermore, the MFP 101 can save an image scanned by itself and a PDL image transmitted from a computer connected on the LAN 104 in a designated user storage area in a HDD 204 (see FIG. 2) in the MFP 101. The MFP 101 can print an image saved in the user storage area.

Moreover, the MFP 101 can load a flow file that describes an image scanning function, facsimile function, PDL function, and the like of itself, and can execute processes according to the description content. The flow file describes at least the types of processes to be executed in the apparatus, and the process content required to execute the processes. Note that the process content includes various parameters required to execute respective processes, an execution order, and the like.

The MFP 101 comprises a WEB browser, and can display a WEB page (WEB information) received using an HTTP protocol from the WEB server 102 on an operation window.

The WEB server 102 provides a WEB site for offering a document registration service and the like in cooperation with a workflow system in the server.

Figure 2:
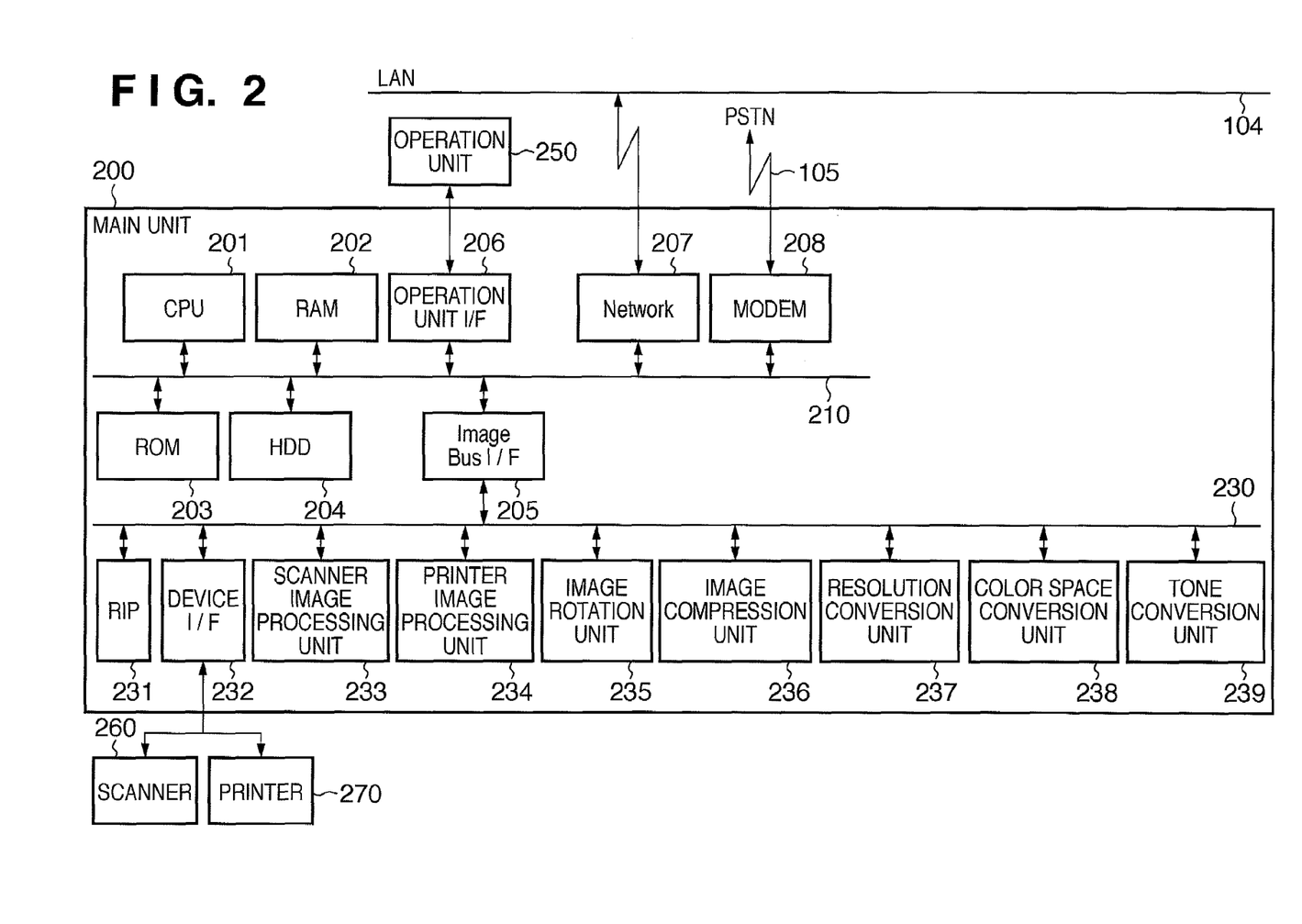
FIG. 2 is a block diagram showing an example of the hardware arrangement of a multi-function peripheral (MFP) 101 according to the embodiment of the invention.

FIG. 2 is a block diagram showing an example of the hardware arrangement of the MFP 101 according to the embodiment of the invention.

Referring to FIG. 2, the MFP 101 comprises a main unit 200. The main unit 200 is a controller for inputting and outputting document data, image information, and device information, and implements a scan function, print function, and the like by connecting a scanner 260 as an image input device and a printer 270 as an image output device. The main unit 200 connects an external apparatus such as a PC or the like via the LAN 104 to exchange data, and also connects the PSTN 105 to implement a FAX function. The main unit 200 is also connected to an operation unit 250. The operation unit 250 serves as an interface for providing these functions to the user.

Components of the main unit 200 will be described below. A CPU 201 is a controller which controls the overall main unit 200. A RAM 202 is a system work memory required for the operations of the CPU 201, and is also used as an image memory for temporarily storing image data. A ROM 203 is a boot ROM, and stores a boot program of the system. An HDD 204 is a hard disk drive, which stores system software, flow files, image data and their attribute data, other user data, and the like. Note that a cooperation process between the MFP 101 and WEB browser according to this embodiment is implemented by system software stored in the HDD 204. The HDD 204 can also be used as a temporary holding area of image data.

An operation unit I/F (interface) 206 is an interface with the operation unit 250, and outputs image data to be displayed on the operation unit 250 to the operation unit 250. Also, the operation unit I/F 206 serves to inform the CPU 201 of information input by the user of this system from the operation unit 250. This operation unit also executes displays and operations of a WEB page (WEB information).

A network interface 207 is connected to the LAN 104 to exchange information with external apparatuses such as the WEB server 102, client computer 103, another MFP, and the like, which are connected on the LAN 104. This system supports TCP/IP as a network communication protocol, and makes communications with the external apparatuses according to the TCP/IP communication protocol. A modem 208 is connected to the PSTN 105 to exchange image information with the facsimile apparatus 106 allocated on a communication line using a FAX function.

The aforementioned devices are connected to a system bus 210.

An image bus I/F 205 is a bus bridge which connects the system bus 210 and an image bus 230 that transfers image data at high speed, and converts the data structure. The image bus 230 comprises a PCI bus or IEEE1394.

The following devices are connected to the image bus 230. A raster image processor (RIP) 231 renders a PDL code input from the client computer 103 allocated on the LAN 104 into a bitmap image. A device I/F 232 connects the scanner 260 and printer 270 as the image input and output devices to the main unit 200, and performs conversion between synchronous and asynchronous systems of image data.

A scanner image processing unit 233 performs correction, modification, and editing of input image data. Also, the scanner image processing unit 233 has a function of determining based on a chroma signal of an input image whether or not the image is a color or monochrome document, and holding that result. A printer image processing unit 234 performs correction, modification, and editing of output image data. An image rotation unit 235 rotates an image simultaneously with image scanning from the scanner 260 in cooperation with the scanner image processing unit 233, and also rotates an image on the RAM 202. The image rotation unit 235 can rotate an image stored on the RAM 202 or that on the RAM 202 upon printing it out in cooperation with the printer image processing unit. A resolution conversion unit 237 applies a resolution conversion process to an image on the RAM 202 and stores the converted image on the RAM 202 again.

A color space conversion unit 238 converts, for example, a YUV image on the RAM 202 into a Lab image by matrix operations, and stores the converted image on a memory. A tone conversion unit 239 converts, for example, an 8-bit, 256-tone image on the memory into a 1-bit binary image by a method such as error diffusion or the like, and stores the converted image on the memory. An image compression unit 236 applies a JPEG compression/decompression process to multi-valued image data and a JBIG, MMR, MR, or MH compression/decompression process to binary image data.

The image rotation unit 235, image compression unit 236, resolution conversion unit 237, color space conversion unit 238, and tone conversion unit 239 can operate in collaboration with each other. For example, upon applying image rotation and resolution conversion to an image on the memory, these processes can be executed without the intervention of the memory.

Figure 3:
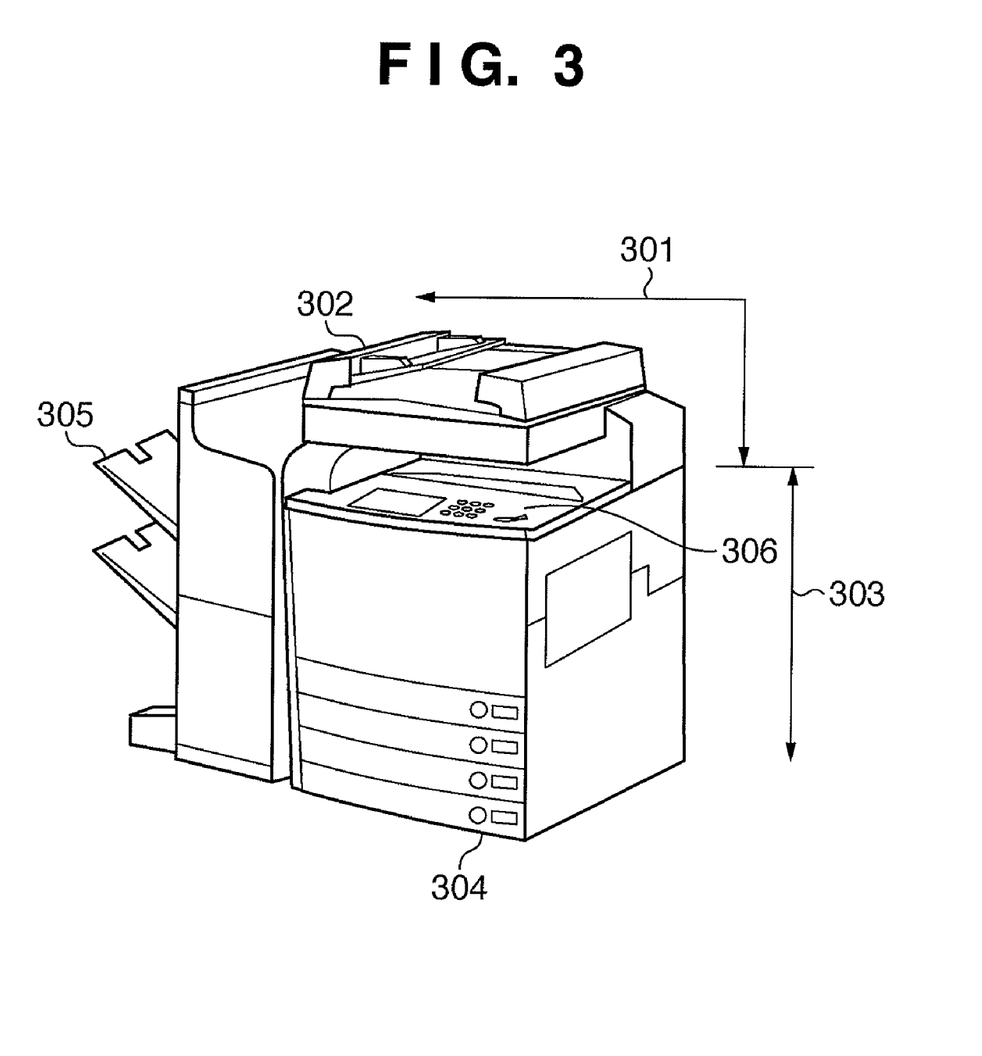
FIG. 3 is a view showing an example of the overview of the MFP 101 according to the embodiment of the invention.

FIG. 3 shows an example of the overview of the MFP 101 according to the embodiment of the invention. The MFP 101 is roughly divided into a scanner unit 301 and printer unit 303, and comprises a document copying function, FAX function, printer function, and document management function.

The scanner unit 301 as an image input device converts an image into an electrical signal of raster image data by irradiating the image on a sheet to be a document with light and scanning a CCD line sensor. Document sheets are set on a tray of a document feeder 302. When the user inputs a scanning start instruction using an operation unit 306, the CPU 201 in FIG. 2 provides the instruction to the scanner, and the document feeder 302 feeds document sheets one by one to execute document scanning operations.

The printer unit 303 as an image output device converts the raster image into an image on a paper sheet (prints it on a paper sheet). As the image conversion method, an electrophotographic method using a photosensitive drum or photosensitive belt, an ink-jet method that directly prints an image on a paper sheet by ejecting ink from a minute nozzle array, and the like are available. Any of these methods may be used.

A print operation starts in response to an instruction from the CPU 201. The printer unit 303 comprises a plurality of paper feed sources 304 which allow the user to select different paper sizes or different paper orientations, and are used by setting paper cassettes corresponding to such sizes or orientations. A paper discharge tray 305 receives printed paper sheets, and allows settings of sorting, stapling, and the like in accordance with instructions from the CPU 201.

Note that the WEB browser which cooperates with the MFP 101 according to this embodiment is displayed on a display unit of the operation unit 306.

Figure 4:
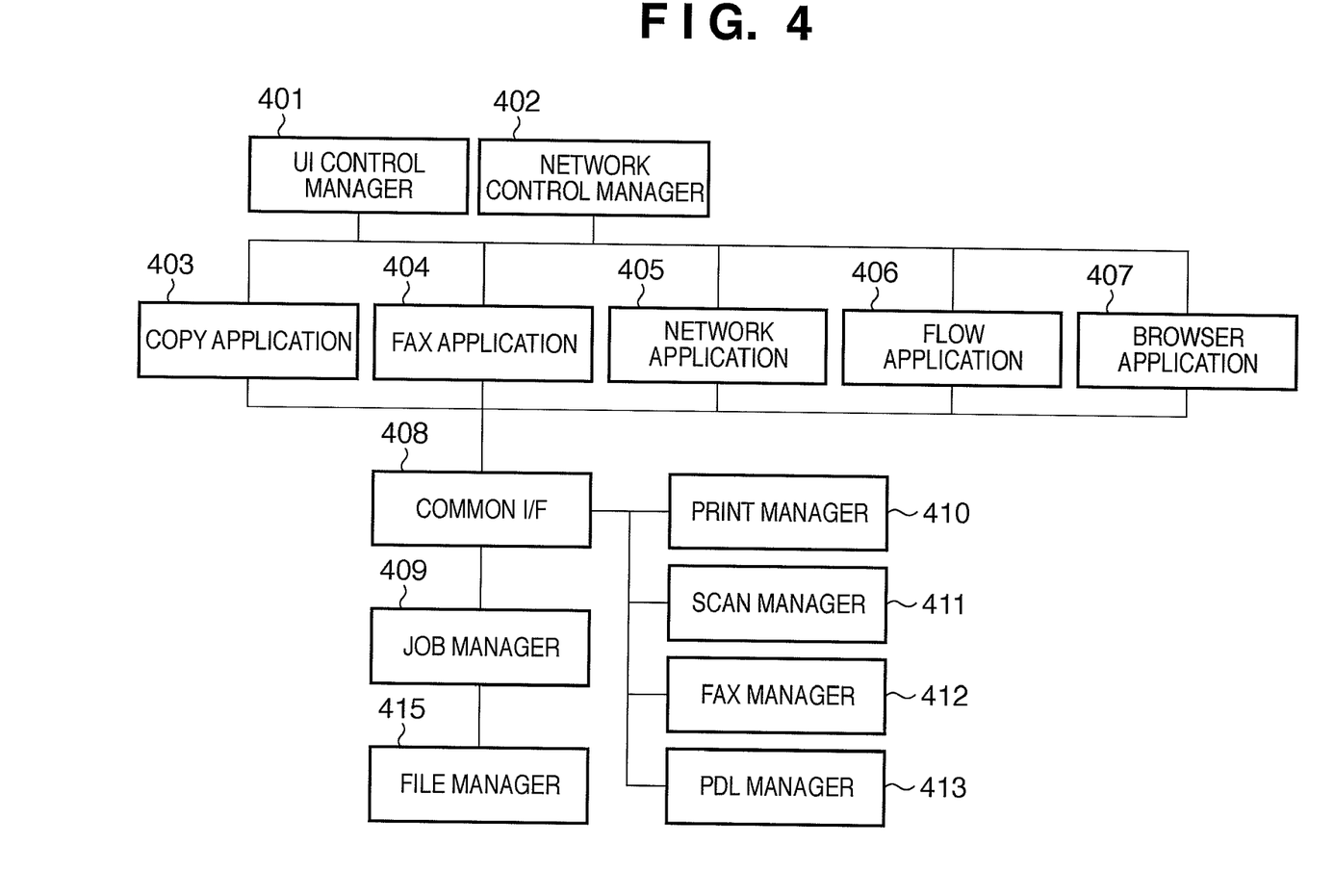
FIG. 4 is a block diagram showing an example of the software configuration of the MFP 101 according to the embodiment of the invention.

FIG. 4 is a block diagram showing an example of the software configuration of the MFP 101 according to this embodiment. Programs corresponding to respective software blocks shown in FIG. 4 are stored in the HDD 204 shown in FIG. 2.

A UI control manager 401 controls a display operation unit, and executes control for informing lower layer modules of instructions from the user, and displaying information from lower layers on a UI. A network control manager 402 executes control for receiving instructions and information from a network such as the LAN 104, and transmitting instructions and information from the main unit 200.

A copy application 403, FAX application 404, and network application 405 receive instructions from the UI control manager 401 and network control manager 402 and create job files. According to such job files, control managers 410 to 413 of a plurality of processing units execute jobs.

A flow application 406 controls a job manager 409 to execute a pre-saved flow file in response to an instruction from the UI control manager 401. A browser application 407 interprets HTML data received from the network control manager 402 to inform the UI control manager 401 of display information, and processes operation information on the browser provided from the UI control manager 401.

The cooperation process between the MFP 101 and browser of this embodiment is executed as follows. That is, the cooperation process is implemented in such a manner that operation information from the browser application 407 is transferred to the flow application 406, and the process result of the flow application 406 is processed by the browser application 407.

A common interface 408 absorbs device dependent parts of the control managers of various processing units. The job manager 409 organizes job information in a flow file received from the common interface 408 or an individual job, and transfers the organized information to any of the control managers 410 to 413. The job manager 409 executes a startup process, synchronization process, end process, and so forth of the control managers 410 to 413 according to the types of jobs. That is, the job manager 409 executes the startup process, synchronization process, end process, and like of the scan manager 411 and print manager 410 for a local copy job. Also, the job manager 409 executes the startup process, synchronization process, end process, and the like of the scan manager 411, the file manager 415 for document saving, and the FAX manager 412 for a FAX transmission job. Furthermore, for a PDL print job such as LIPS, PostScript, or the like, the job manager 409 executes the startup process, synchronization process, end process, and the like of the PDL manager 413, file manager 415, and print manager 410. Note that the job manager 409 also processes a job which is transmitted from the flow application 406 and combines a plurality of processes.

The file manager 415 executes processes for saving image data used in a job and job files in the HDD 204 and loading out them.

Figure 5:
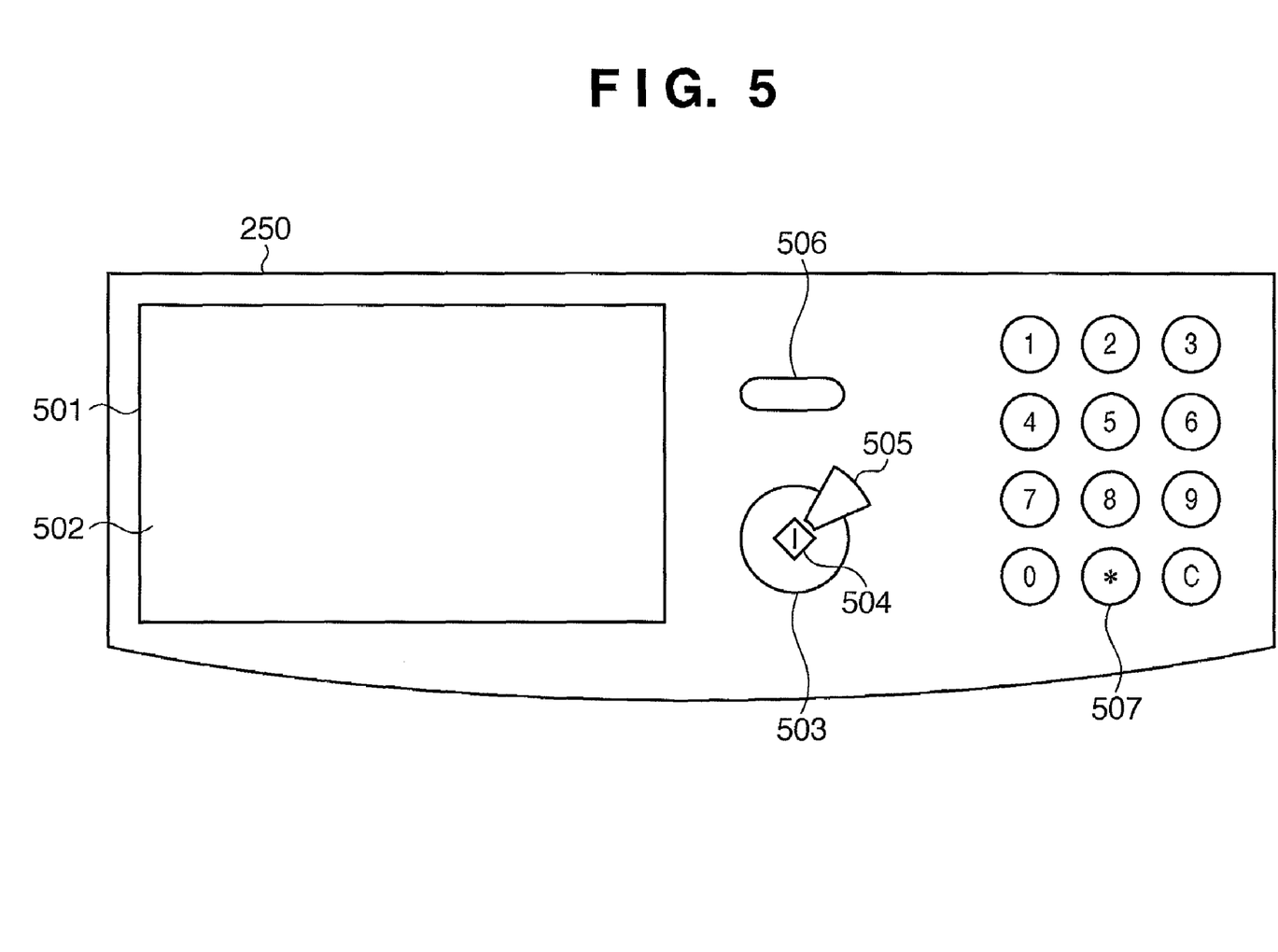
FIG. 5 is a view showing an example of the arrangement of an operation unit 250 according to the embodiment of the invention.

FIG. 5 shows an example of the arrangement of the operation unit 250 according to the embodiment of the invention. In FIG. 5, an LCD display unit 501 is prepared by adhering a touch panel sheet 502 on an LCD. The LCD display unit 501 displays an operation window of the MFP 101 and soft keys, and informs the CPU 201 of position information of each displayed key when that key is pressed. A start key 503 is used to start, for example, a document scanning operation.

The center of this start key 503 includes a two-color LED 504 which includes green and red LEDs, and indicates by its display color whether or not the start key 503 is ready to use. A stop key 505 is used to stop the active operation. A reset key 506 can be used to reset settings on the operation unit 250. A numeric keypad 507 can be used to input a FAX number, the number of copies, and the like.

In the MFP 101, the WEB browser is displayed on the LCD display unit 501, and can receive operations from the user using the soft keys on the touch panel sheet 502.

Figure 6A:
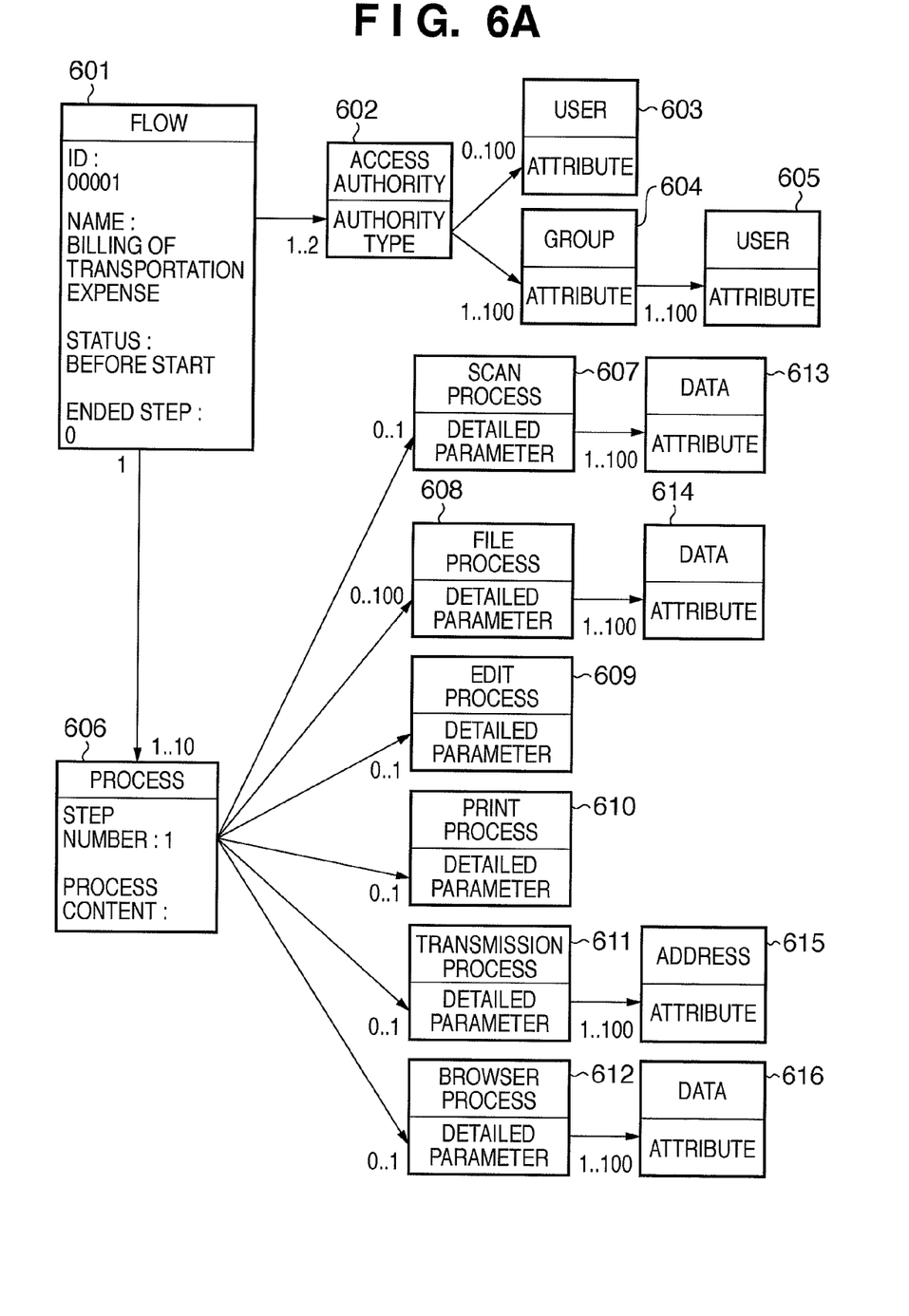
FIG. 6A is a view showing an example of the concept of the object configurations of a flow saved in an HDD 204 according to the embodiment of the invention.
Figure 8:
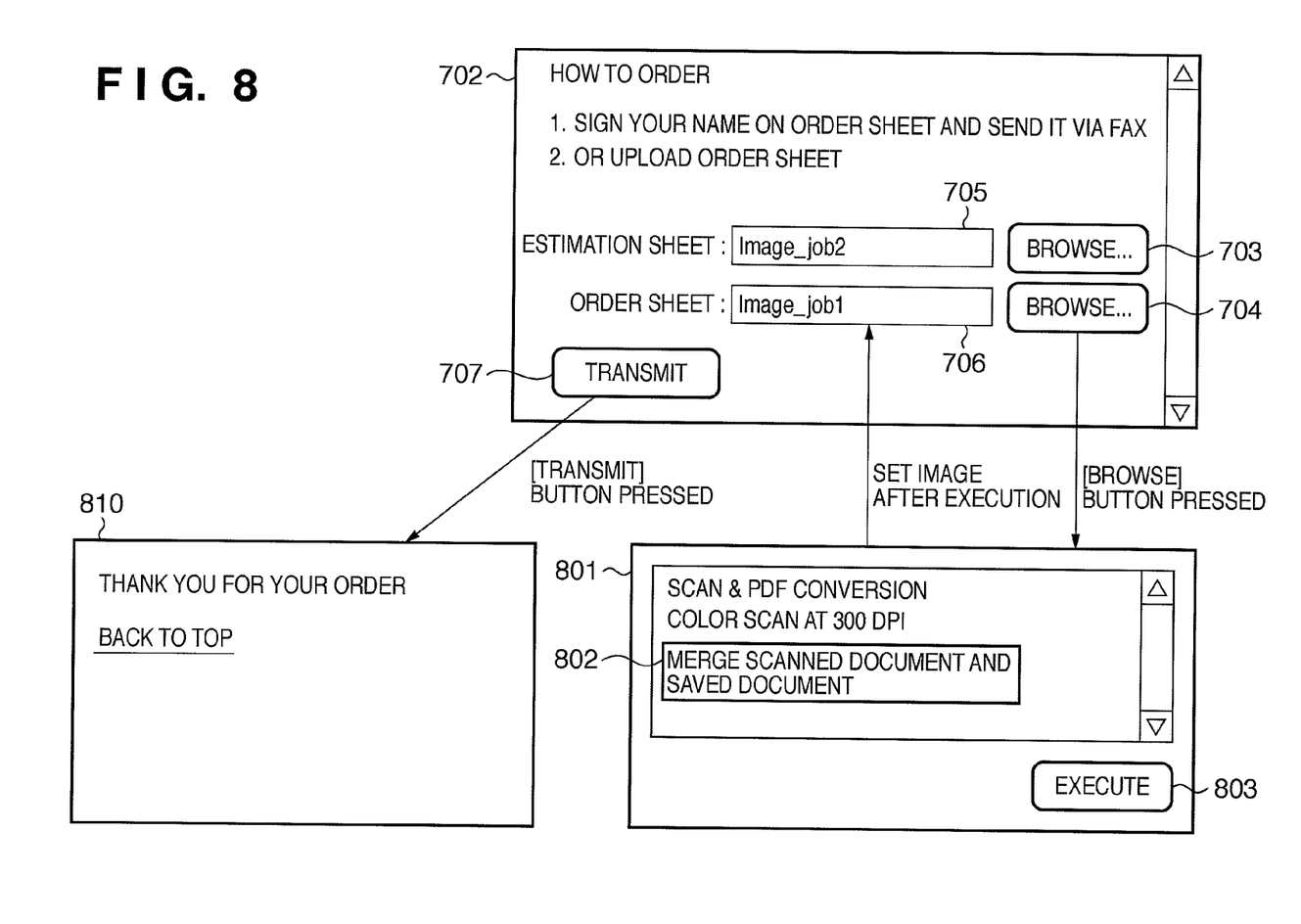
FIG. 8 is a view showing a screen transition state according to the embodiment of the invention.

FIG. 6A is a view showing an example of the concept of the object configurations of a flow file saved in the HDD 204 according to the embodiment of the invention. The MFP 101 according to this embodiment executes respective processes based on a flow file shown in FIG. 6B, which is saved in an XML format according to this object configuration view. Upon execution of processes, the user can operate a button of a flow list displayed on the operation unit 250, as shown in FIG. 8. At the time of execution, a flow file is managed by being copied on the HDD 204, and saving respective statuses in a format.

A flow object 601 comprises, as parameters, an ID, a flow name, a status used to manage the execution state of the flow, an end step used to store the number of ended steps, and the like. An access authority to the flow is managed by an access authority object 602. The access authority object 602 comprises an authority type as a parameter, and stores types "execution authority" and "editorial authority". The access authority object 602 gives users and a group having the authorities set by this object to user objects 603 and 605 and a group object 604.

A process object 606 manages a process to be actually executed. The process object 606 includes parameters that describe a step number indicating the order of the step, and a process content indicating the content type of a process. According to the process content, any of objects 607 to 612 that manage detailed parameters is linked to the process content of the process object 606.

The scan process object 607 includes a parameter that saves detailed scan settings. A data object 613 used to manage scanned data after scanning is linked to the scan process object 607. The file process object 608 is linked when a file saved in the HDD 204 is used as data. This object is also linked to a data object 614.

The edit process object 609 is a management object used to edit a file obtained by the scan process or file process. The edit process includes processes such as a merge process, page delete process, and the like. The print process object 610 manages a detailed parameter in printing such as 2-in-1 printing, double-sided printing, and the like. The transmission process object 611 manages a detailed parameter associated with transmission such as a FAX transmission process, SMTP transmission process, SMB transmission process, FTP transmission process, and the like. Destination information in the transmission process is managed as a destination object 615.

The browser process object 612 holds URL information as a detailed parameter, and displays a list of flow files having URL information that matches a URL of a currently displayed page upon reception of a flow file list request from the browser. The browser process object 612 may be implemented to display a list of all flow files without holding any URL information. The browser process object 612 is also linked to a data object 616 when it uses a file stored in the HDD 204 as data.

Figure 6B:
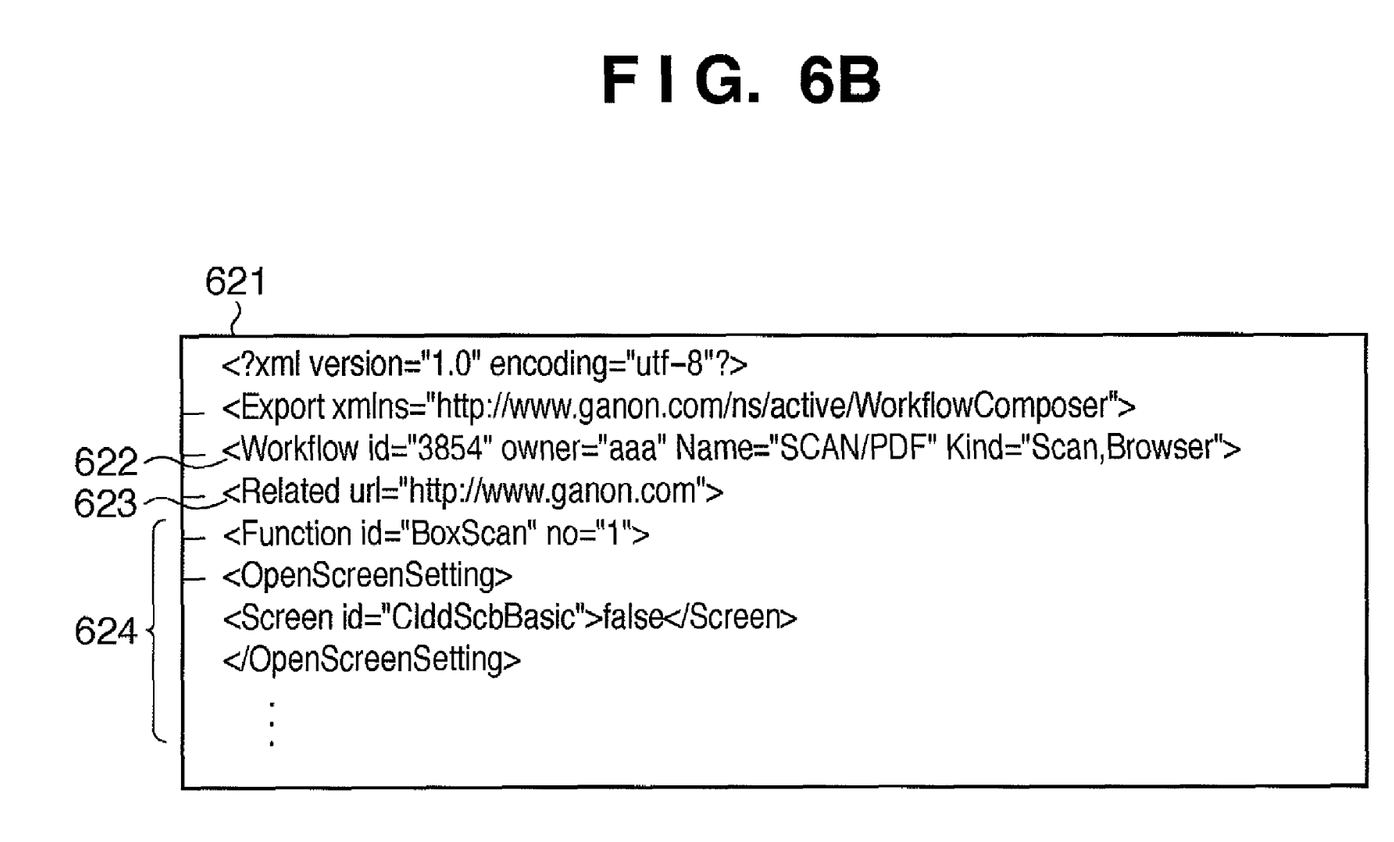
FIG. 6B is a view showing an example of the data structure of a flow file according to the embodiment of the invention.

The data format of a flow file will be described below with reference to FIG. 6B. FIG. 6B shows an example of the data format of a flow file according to the embodiment of the invention.

Referring to FIG. 6B, a flow file 621 includes, as information corresponding to the flow object 601, "Workflow id" 622, which registers information of an ID, owner name, file name, and job type. URL information corresponding to the detailed parameter of the browser process object 612 is included in "Related url" 623. In FIG. 6B, "http://www.ganon.com" is registered as the URL.

A field 624 after "Related url" 623 describes information corresponding to the process object 606 and the objects 607 to 611 according to the process content. The field 624 describes information of respective processes according to their execution order. That is, the process contents are described according to step numbers that indicate the order of steps (execution order) in the process object 606. In FIG. 6B, for example, a process to be executed first describes "BoxScan" as one type of the scan process object.

Figure 7A:
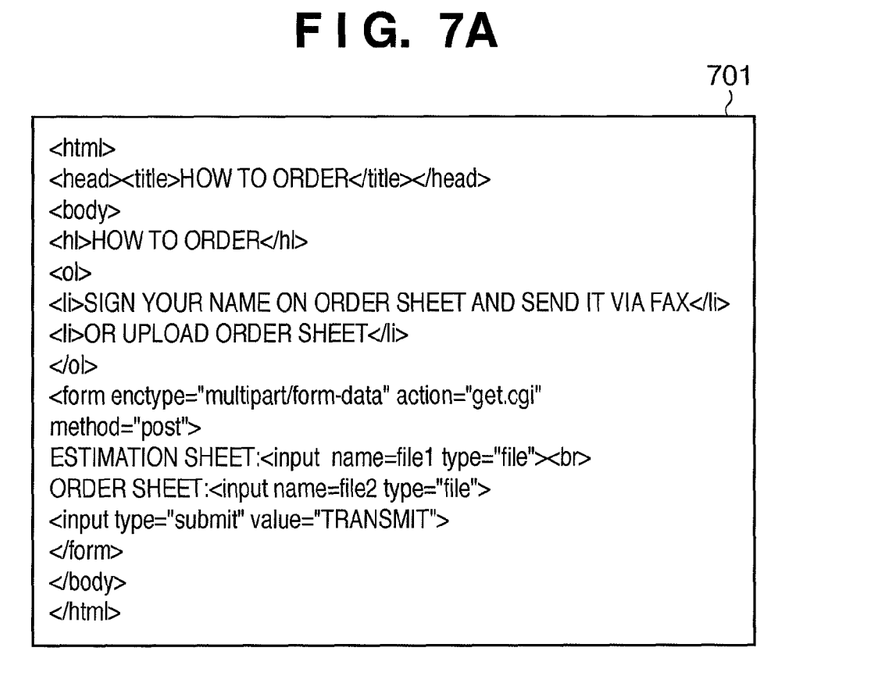
FIG. 7A is a view showing an example of the configuration of an HTML file according to the embodiment of the invention.
Figure 7B:
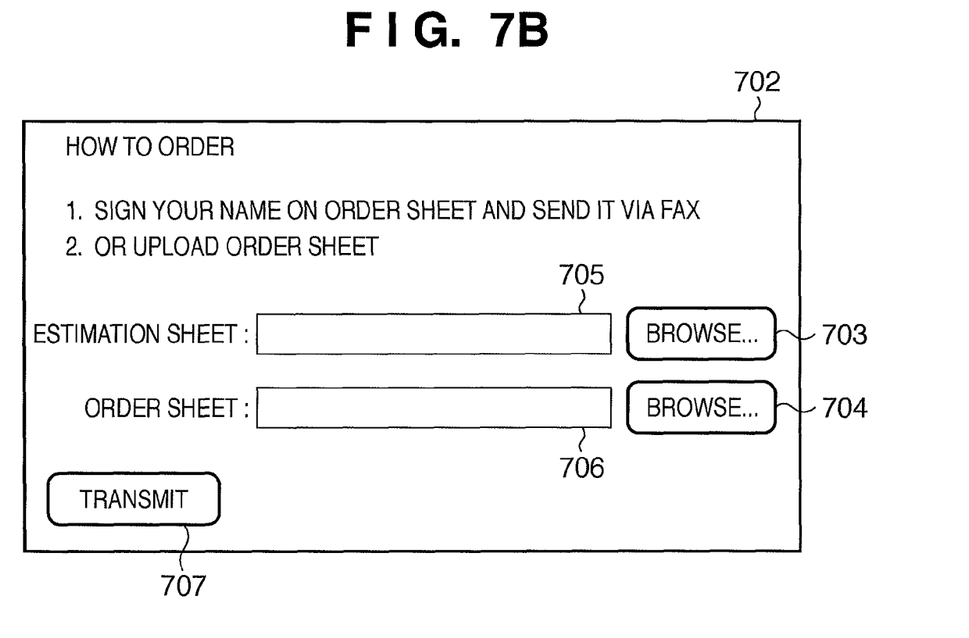
FIG. 7B is a view showing an example of a browser display window corresponding to the HTML file in FIG. 7A.

A screen transition state until image data obtained by executing a flow file is passed to the WEB site using the WEB browser on the MFP 101 according to this embodiment will be described below with reference to FIGS. 7A and 7B and FIG. 8. FIG. 7A shows an example of the configuration of an HTML file according to the embodiment of the invention. FIG. 7B shows an example of a browser display window corresponding to the HTML file shown in FIG. 7A. FIG. 8 shows the screen transition state.

When the MFP 101 receives an HTML file 701 shown in FIG. 7A from the WEB server 102, a browser window 702 shown in FIG. 7B is displayed on the LCD display unit 501 of the operation unit 250 of the MFP 101. Note that FIGS. 7A and 7B show an example of a page in the format that allows registering a plurality of images per page. At this time, the browser window 702 is presented to generate and register image data of an estimation sheet and order sheet.

On such browser window 702 displayed on the screen, the user operates browse buttons 703 and 704 to register an estimation sheet and order sheet. This operation is normally done on a WEB browser on a PC, and the user who is accustomed to PC operations can execute this operation naturally.

Upon operation of each browse button, a flow file list window 801 is displayed on the LCD display unit 501, and a flow file is selected according to a user's instruction. The flow file list window 801 displays a list of flow files 802. The flow file list window 801 in FIG. 8 displays three flow files "scan and PDF conversion", "color scan at 300 dpi", and "merge scanned document and saved document".

The flow files displayed in the list include the URL information corresponding to that of the browser window 702. Whether or not to filter the flow file list using the URL information may be set by the user, or switch information used to limit flow files to be displayed may be embedded in a WEB page (WEB information).

The user selects a desired flow file from the list and presses an execution button 803, thereby executing a flow corresponding to the flow file. After execution of the flow, the display content of the LCD display unit 501 returns to that of the browser window 702, and a file name of image data obtained by execution of the flow is set in a corresponding text box 705 or 706. The file name to be set may automatically match the flow name or may use a default file name in the flow. For example, the text box 706 in FIG. 8 indicates that an image "Image_job1" is obtained as a result of execution of the flow.

After the required data are set and an operation by a transmission button 707 is received (transmission instruction reception), the browser application 407 transfers these image data to the WEB server 102 by the HTTP protocol. After a reception acknowledgement is obtained from the WEB server 102, a display window 810 is displayed on the LCD display unit 501.

Figure 9:
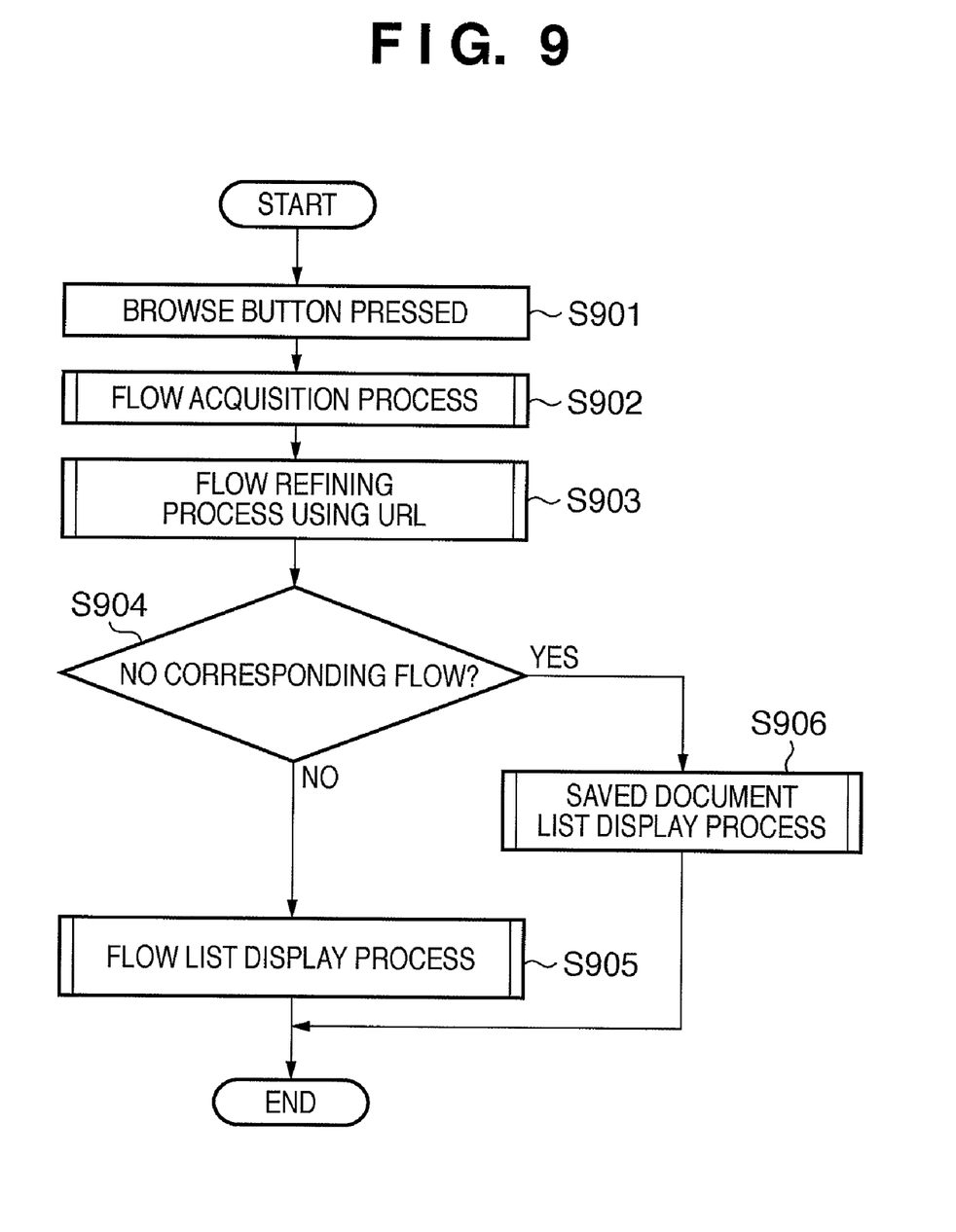
FIG. 9 is a flowchart showing an example of processing until a flow list is displayed according to the embodiment of the invention.

Processing executed when image data is registered in a WEB site using the WEB browser according to the embodiment of the present invention will be described below with reference to FIG. 9. This processing corresponds to processes executed until the window 801 is displayed from the browser window 702 shown in FIG. 8 upon operation of the browse button 703 or 704.

Upon detection of the operation of the browse button 703 or 704 by the user in step S901, the browser application 407 executes an acquisition process of flows held in the HDD 204 in step S902. This process is executed inside the flow application 406 when the browser application 407 instructs the flow application 406. In this case, the browser application 407 notifies the flow application 406 of information associated with the currently displayed WEB page (WEB information) as a parameter. This information includes at least URL information used upon acquiring the WEB page. The flow application 406 acquires flows including information associated with the browser process object 612 from those saved in the HDD 204.

In step S903, the flow application 406 refines flow files to be displayed based on the URL information. In this step, flows including the URL of the WEB page information notified from the browser application 407 are selected from those acquired in step S902, thus determining the flows to be displayed. More specifically, the flow application 406 acquires a URL described in the field "Related url" 623 in the data configuration of the flow file 621 in FIG. 6B, and determines whether or not the acquired URL matches that of the WEB page information. Note that the URLs may match either partially or fully.

In FIG. 6B, "Related url" 623 describes "http://www.ganon.com". In this case, if the URL notified from the browser application 407 includes "http://www.ganon.com", a match can be determined. Upon determination of URL matching, if a URL is described hierarchically like "http://www.ganon.com/xxx/ddd/document/", the number of layers to be matched may be set in advance. For example, if the number of layers is "1", "http://www.ganon.com" need only be matched. On the other hand, if the number of layers is "3", the URL needs to be matched up to "http://www.ganon.com/xxx/ddd". Note that a flow file which does not include any information that matches the URL is deleted from list information. After that, the process proceeds to step S904.

In the refining process in step S903, the flow application 406 may further refine flow files based on an item of a job attribute (Kind) in each flow file in addition to the URL information. For example, when only flow files including an image input function, that is, a scanner process are to be displayed as a list, flow files each of which describes a value "Scan" in the "Kind" item can be selected.

The flow application 406 notifies the browser application 407 of the acquired flow list. In step S904, the browser application 407 that received the flow list confirms the number of files in the list. If the flow list includes at least one flow file, since there is a corresponding flow ("NO" in step S904), the process proceeds to step S905. If the flow list includes no flow file, since there is no corresponding flow ("YES" in step S904), the process proceeds to step S906.

In step S905, the browser application 407 displays the flow list on an operation panel. Note that an example of the process result in step S906 corresponds to the browser window 801 in FIG. 8.

In step S906, the browser application 407 acquires a list of documents already saved in the HDD 204, and displays that list on the operation panel. In this case, a saved document is passed to the browser intact without any flow process. The process in step S906 may be skipped based on a user's setting.

As described above, the image forming apparatus of this embodiment can receive a workflow to be executed for, for example, each image data, since it displays a WEB page according to the acquired HTML file. For this reason, the image forming apparatus can also receive, for example, a plurality of image data.

Figure 10:
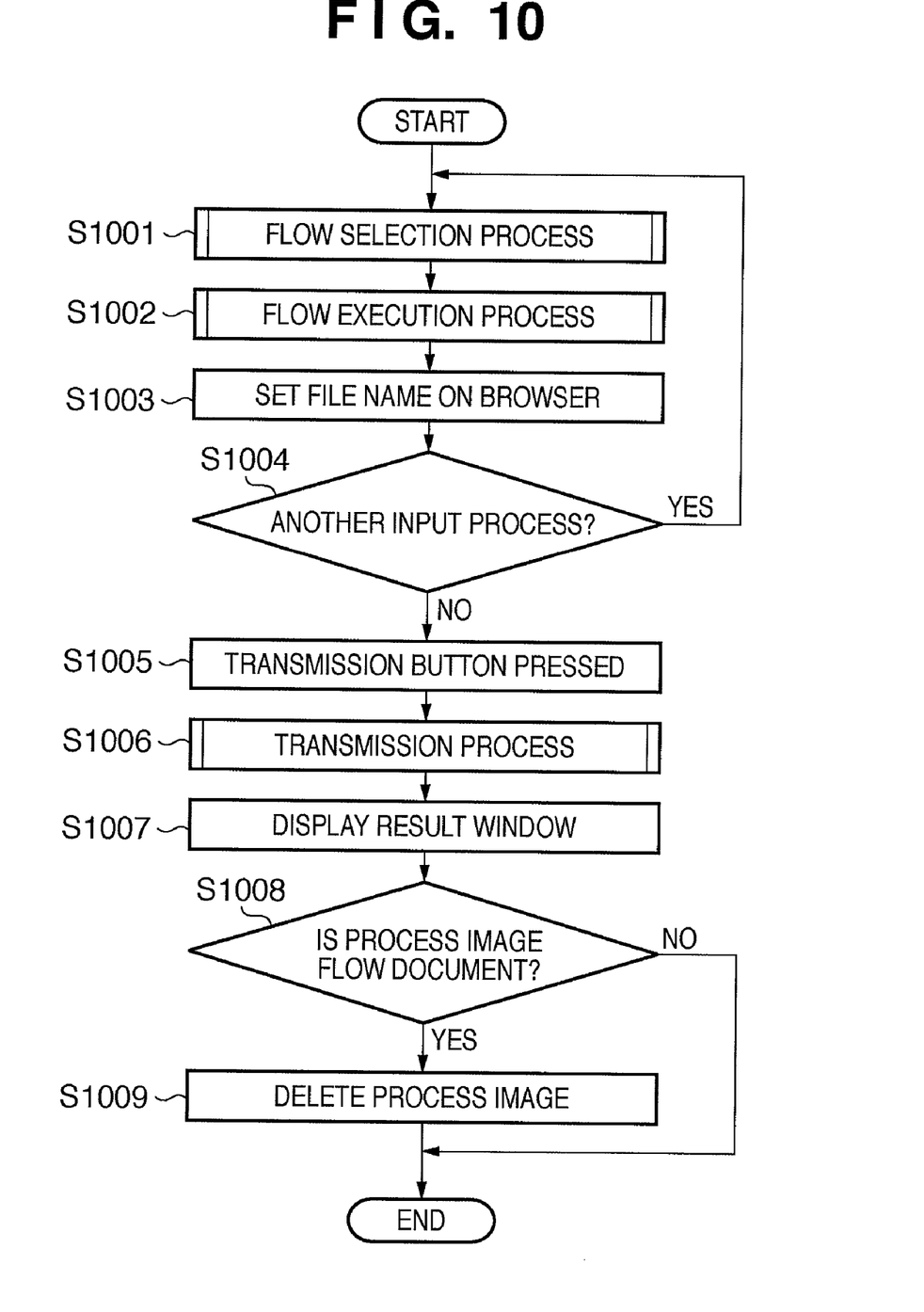
FIG. 10 is a flowchart showing an example of processing from execution of a flow until completion of registration of image data according to the embodiment of the invention.

Processing executed when image data is registered in a WEB site using the WEB browser in the MFP 101 according to this embodiment will be described below with reference to FIG. 10. FIG. 10 is a flowchart showing an example of that processing. This processing corresponds to processes executed until the result window 810 is displayed from the flow list window 801 shown in FIG. 8.

Referring to FIG. 10, the browser application 407 acquires a flow file for WEB information selected by the user in step S1001, and notifies the flow application 406 of an instruction required to process a flow which is instructed to be executed.

In step S1002, the flow application 406 executes a process according to the content described in the selected flow file. The flow application 406 saves image data obtained as a result of execution of the flow file in the data object 616 in FIG. 6A, and notifies the browser application 407 of that image data.

In step S1003, the browser application 407 sets and displays a file name of the image data on the browser. A display example at that time is that shown in the text box 705 or 706 in FIG. 8.

The flow application 406 determines in step S1004 whether or not another input process is to be executed, based on whether or not the user operates another browse button. If another input process is to be executed ("YES" in step S1004), the process returns to step S1001 to repeat the processes. On the other hand, if another input process is not to be executed ("NO" in step S1004), the process proceeds to step S1005.

In step S1005, the browser application 407 detects an operation (transmission instruction) of the transmission button 707 by the user. If the operation of the transmission button 707 is detected (transmission instruction reception), the browser application 407 transmits the data to be uploaded to the WEB site to the WEB server 102 by a transmission process according to the HTTP protocol in step S1006. More specifically, the image data obtained upon execution of the workflow is saved in the HDD 204 or the like in association with the browser. Hence, since the image data is loaded in accordance with the user's transmission instruction, the transmission process in step S1005 can be implemented. In step S1007, upon reception of a transmission completion message from the WEB server 102, the browser application 407 displays the result window 810.

After that, the browser application 407 determines in step S1008 whether or not the image data transmitted in step S1006 is image data obtained by the flow process. If the image data is a document obtained by the flow process ("YES" in step S1008), the process proceeds to step S1009. In step S1009, a delete process of the image data temporarily held in the HDD 204 is executed, thus ending this processing. On the other hand, if the image is not an image obtained by the flow process but it is an existing saved document ("NO" in step S1008), the processing ends intact without executing any image data delete process.

According to such process in step S1009, an image can be prevented from being wastefully saved. Note that an instruction to inhibit deletion of generated image data may be received from the user. After completion of transmission, a confirmation window that prompts the user to confirm whether or not to delete data may be displayed, and a user's instruction may be received.

Note that the determining process in step S1008 can be implemented using the determination result in step S904. More specifically, if it is determined in step S904 that there is no corresponding flow ("YES" in step S904), since a document cannot be obtained by the flow process, "NO" is determined in step S1008.

On the other hand, if it is determined in step S904 that there is a corresponding flow ("NO" in step S904), since a document can be obtained by the flow process, "YES" is determined in step S1008.

As described above, according to the embodiment of the invention, an image can be easily directly registered from the apparatus in the WEB site using the WEB browser installed in the apparatus, thus improving the user's convenience. Since the need for building a dedicated WEB site for the apparatus can be obviated, labor required for site building can be saved. Furthermore, since the apparatus comprises the present invention, the apparatus can be used in workflows using various types of WEB sites, thus broadening the use range of the apparatus.

[Other Embodiments]

The above-described exemplary embodiments of the present invention can also be achieved by providing a computer-readable storage medium that stores program code of software (computer program) which realizes the operations of the above-described exemplary embodiments, to a system or an apparatus. Further, the above-described exemplary embodiments can be achieved by program code (computer program) stored in a storage medium read and executed by a computer (CPU or micro-processing unit (MPU)) of a system or an apparatus.

The computer program realizes each step included in the flowcharts of the above-mentioned exemplary embodiments. Namely, the computer program is a program that corresponds to each processing unit of each step included in the flowcharts for causing a computer to function. In this case, the computer program itself read from a computer-readable storage medium realizes the operations of the above-described exemplary embodiments, and the storage medium storing the computer program constitutes the present invention.

Further, the storage medium which provides the computer program can be, for example, a floppy disk, a hard disk, a magnetic storage medium such as a magnetic tape, an optical/magneto-optical storage medium such as a magneto-optical disk (MO), a compact disc (CD), a digital versatile disc (DVD), a CD read-only memory (CD-ROM), a CD recordable (CD-R), a nonvolatile semiconductor memory, a ROM and so on.

Further, an OS or the like working on a computer can also perform a part or the whole of processes according to instructions of the computer program and realize functions of the above-described exemplary embodiments.

In the above-described exemplary embodiments, the CPU jointly executes each step in the flowchart with a memory, hard disk, a display device and so on. However, the present invention is not limited to the above configuration, and a dedicated electronic circuit can perform a part or the whole of processes in each step described in each flowchart in place of the CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2007-218934, filed Aug. 24, 2007, which is hereby incorporated by reference herein in its entirety.

What is claimed is:

1. An image processing apparatus, which can communicate with an external apparatus that provides WEB information, comprising:
a storage unit configured to store a plurality of flow files that describe process contents of processes to be executed by the image processing apparatus, and an execution order;
an acquisition unit configured to acquire WEB information from the external apparatus;
a display unit configured to display a window based on the acquired WEB information;
a selecting unit configured to select a flow file to be executed for the WEB information acquired by the acquisition unit;
a processing unit configured to generate image data based on execution of the selected flow file;
a storing unit configured to store the image data generated by the processing unit; and
a transmission unit configured to transmit the image data stored in the storing unit to the external apparatus in accordance with a transmission instruction input via the window displayed by the display unit,
wherein the selecting unit selects the flow file to be executed from flow files including URL information which at least partially matches URL information upon acquiring the WEB information, and selects a flow file to be displayed based on the process content which is described in the flow file and which is to be executed based on the flow file.

2. The apparatus according to claim 1, wherein the selecting unit receives selection of the flow file for each image data to be generated, and
when a plurality of image data are generated, the transmission unit transmits the plurality of image data to the external apparatus in accordance with the transmission instruction.

3. The apparatus according to claim 1, further comprising a temporary memory configured to temporarily store the generated image data,
wherein upon completion of transmission of the image data by the transmission unit, the image data temporarily stored in the temporary memory is deleted.

4. The apparatus according to claim 1, further comprising:
a temporary memory configured to temporarily store the generated image data; and
an instruction receiving unit configured to receive an instruction as to whether or not to delete the image data temporarily stored in the temporary memory upon completion of transmission of the image data by the transmission unit,
wherein when the instruction to delete the image data is received, the image data temporarily stored in the temporary memory is deleted.

5. A method of controlling an image processing apparatus, which can communicate with an external apparatus that provides WEB information, and comprises a storage unit which stores a plurality of flow files that describe process contents of processes to be executed by the apparatus, and an execution order, comprising:
acquiring WEB information from the external apparatus;
displaying a window based on the acquired WEB information;
selecting a flow file to be executed for the acquired WEB information;
generating image data based on execution of the selected flow file;
storing the image data generated in the processing step; and
transmitting the image data stored at the storing to the external apparatus in accordance with a transmission instruction input via the window displayed at the displaying,
wherein at the selecting, the flow file to be executed is selected from flow files including URL information which at least partially matches URL information upon acquiring the WEB information, and a flow file to be displayed is selected based on the process content which is described in the flow file and which is to be executed based on the flow file.

6. The method according to claim 5, wherein at the selecting, selection of the flow file for each image data to be generated is received, and
when a plurality of image data are generated, the plurality of image data are transmitted to the external apparatus in accordance with the transmission instruction at the transmitting.

7. The method according to claim 5, further comprising:
temporarily storing the generated image data; and
deleting the image data temporarily stored at the temporarily storing upon completion of transmission of the image data at the transmitting.

8. The method according to claim 5, further comprising:
temporarily storing the generated image data;

receiving an instruction as to whether or not to delete the image data temporarily stored at the temporarily storing upon completion of transmission of the image data at the transmitting; and deleting the image data temporarily stored at the temporarily storing when the instruction to delete the image data is received.

9. A non-transitory computer-readable storage medium retrievably storing a computer-executable program for making a computer function as an image processing apparatus according to claim 1.

* * * * *